United States Patent
Jayaraman et al.

(10) Patent No.: US 10,230,614 B2
(45) Date of Patent: Mar. 12, 2019

(54) SYSTEM AND METHOD FOR IMPROVING INTEGRATION TESTING IN A CLOUD COMPUTING ENVIRONMENT

(71) Applicant: Wipro Limited, Bangalore (IN)

(72) Inventors: Venkata Subramanian Jayaraman, Chennai (IN); Sumithra Sundaresan, Chennai (IN)

(73) Assignee: Wipro Limited, Bangalore (IN)

( * ) Notice: Subject to any disclaimer, the term of this patent is extended or adjusted under 35 U.S.C. 154(b) by 374 days.

(21) Appl. No.: 14/943,631

(22) Filed: Nov. 17, 2015

(65) Prior Publication Data

US 2017/0093684 A1   Mar. 30, 2017

(30) Foreign Application Priority Data

Sep. 28, 2015   (IN) ........................... 5184/CHE/2015

(51) Int. Cl.

| | |
|---|---|
| *G06F 15/173* | (2006.01) |
| *H04L 12/26* | (2006.01) |
| *G06F 11/36* | (2006.01) |
| *G06F 11/00* | (2006.01) |
| *G06Q 30/00* | (2012.01) |
| *G06F 8/71* | (2018.01) |
| *G06F 8/60* | (2018.01) |

(52) U.S. Cl.
CPC ............... *H04L 43/50* (2013.01); *G06F 8/71* (2013.01); *G06F 11/008* (2013.01); *G06F 11/3676* (2013.01); *G06Q 30/012* (2013.01); *G06F 8/60* (2013.01)

(58) Field of Classification Search
CPC ............. H04L 41/0803; H04L 41/0806; H04L 67/2804; G06F 8/60
USPC ........................................................ 709/224
See application file for complete search history.

(56) References Cited

U.S. PATENT DOCUMENTS

| | | | |
|---|---|---|---|
| 8,769,083 B2 | 7/2014 | Ferris et al. | |
| 9,495,249 B1 * | 11/2016 | Franklin | ................ G06F 11/167 |
| 2013/0054792 A1 * | 2/2013 | Sharaf | ...................... G06F 8/20 |
| | | | 709/224 |

(Continued)

FOREIGN PATENT DOCUMENTS

WO   2014204470 A1   12/2014

*Primary Examiner* — Tauqir Hussain
(74) *Attorney, Agent, or Firm* — LeClairRyan PLLC (57) ABSTRACT

A system and method for improving integration testing in a cloud computing environment includes collecting one or more input parameters associated with each of one or more products, deployed in cloud computing environment, from one or more external resources and test management systems. The input parameters include one or more defect parameters, user requirements, test parameters or performance parameters associated with the product. The integration testing improvement system determines one or more failure issues associated with the product and analyzes the behavior of the product over a predetermined time period to identify a failure pattern associated with the product. Each of the determined failure issues is mapped with the identified failure pattern to detect one or more critical scenarios in each of the products. Later the critical scenarios are automated by executing associated test scripts thereby improving the integration testing in the cloud computing environment.

21 Claims, 6 Drawing Sheets

(56) References Cited

U.S. PATENT DOCUMENTS

| | | | |
|---|---|---|---|
| 2013/0132774 A1* | 5/2013 | Somendra | G06F 11/3688 714/32 |
| 2014/0109051 A1 | 4/2014 | McDonald et al. | |
| 2014/0122935 A1 | 5/2014 | Li et al. | |
| 2014/0195853 A1 | 7/2014 | Singh et al. | |
| 2015/0052402 A1 | 2/2015 | Gurumurthy et al. | |
| 2015/0085094 A1 | 3/2015 | Fujimori et al. | |
| 2015/0120893 A1 | 4/2015 | Sapaliga et al. | |

* cited by examiner

SYSTEM AND METHOD FOR IMPROVING INTEGRATION TESTING IN A CLOUD COMPUTING ENVIRONMENT

This application claims the benefit of Indian Patent Application Serial No. 5184/CHE/2015 filed Sep. 28, 2015, which is hereby incorporated by reference in its entirety.

FIELD

The present subject matter is related, in general to integration testing, and more particularly, but not exclusively to a system and method for improving integration testing in a cloud computing environment.

BACKGROUND

Cloud computing is a type of computing which relies on sharing computing resources to handle applications. The cloud in general is more efficient and requires fewer resources for computation thus saving time and energy. Hence, predominantly most of the organizations rely on cloud computing to serve their customers in a better and efficient way.

However, there exist few problems for performing software testing of applications in the cloud environment as they are susceptible to response time delays, loading effects, security breaches, configuration issues and other factors. Integration testing, sometimes called integration and testing is the phase in software testing in which individual software modules are combined and tested as a group. A tester performing the integration testing in the cloud environment often faces numerous challenges because of not having a control on the underlying environment in the cloud. The other challenges are that the tester will have to anticipate risks like crashes, network breakdown or server failure since there is no interaction between the one or more components of the application. There is no standard way for performing integration testing with respect to specific business case done and hence the testers often end up in situations of failure.

The conventional approaches of testing require expensive dedicated infrastructure and resources. With the growing complexity of business applications, it is harder to build and maintain in-house testing facilities that mimic real-time environments.

The issues mainly faced in improving integration testing in a cloud computing environment are testing the network failures and functionalities in real time, without making any changes to the underlying configuration of the cloud computing environment and also identifying specific scenarios associated with each product which needs to be tested immediately in the cloud environment.

SUMMARY

Disclosed herein is a system and method for improving integration testing in a cloud computing environment. The integration testing improvement system determines one or more failure issues associated with one or more products and analyzes the behavior of the products over a predetermined time period to identify a failure pattern. Each of the determined failure issues is mapped with the failure pattern to detect one or more critical scenarios in each of the products. The critical scenarios are automated so that the product tested in the cloud computing environment is effective.

Accordingly, the present disclosure relates to a method for improving integration testing in a cloud computing environment. The method comprises receiving, by an integration testing improvement system, one or more input parameters, associated with one or more products in the cloud computing environment. Upon receiving the one or more input parameters, the method proceeds to determine one or more failure issues corresponding to each of the one or more products based on the one or more input parameters. The method further comprises analyzing the behavior of each of the one or more products for a predetermined time period based on the one or more input parameters to identify one or more failure patterns corresponding to each of the one or more products. The integration testing improvement system maps the one or more failure issues with the one or more failure patterns to detect one or more critical scenarios in each of the one or more products. The detected critical scenarios are automated by executing associated test scripts, thereby improving the integration testing in the cloud computing environment.

Further, the present disclosure relates to an integration testing improvement system for improving integration testing in a cloud computing environment, wherein the integration testing improvement system comprises a processor and a memory communicatively coupled to the processor, wherein the memory stores processor-executable instructions, which, on execution, causes the processor to receive one or more input parameters. The one or more input parameters are associated with one or more products in the cloud computing environment. The processor determines one or more failure issues corresponding to each of the one or more products based on the one or more input parameters. Further, the processor analyzes behavior of each of the one or more products for a predetermined time period based on one or more input parameters to identify one or more failure patterns corresponding to each of the one or more products. The processor maps the one or more failure issues with the one or more failure patterns to detect one or more critical scenarios in each of the one or more products. Further, the processor automates the one or more critical scenarios by executing associated test scripts, thereby improving the integration testing in the cloud computing environment.

Furthermore, the present disclosure relates to a non-transitory computer readable medium including instructions stored thereon that when processed by at least one processor cause an integration testing improvement system to perform the acts of receiving one or more input parameters associated with one or more products in the cloud computing environment. The instructions further cause the integration testing improvement system to determine one or more failure issues corresponding to each of the one or more products based on the one or more input parameters. Thereafter, the integration testing improvement system analyzes behavior of each of the one or more products for a predetermined time period based on one or more input parameters to identify one or more failure patterns corresponding to each of the one or more products. The identified one or more failure patterns are mapped with the one or more failure issues to detect one or more critical scenarios in each of the one or more products. The integration testing improvement system further automates the one or more critical scenarios by executing associated test scripts, thereby improving the integration testing in the cloud computing environment.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a system and method for improving integration testing in a cloud computing environment. The integration testing improvement system determines one or more failure issues associated with a product and analyzes the behavior of the product over a predetermined time period to identify a failure pattern. Each of the determined failure issues is mapped with the identified failure pattern to detect one or more critical scenarios in each of the products. The critical scenarios corresponding to each of the products are used to identify business scenarios that could be automated so that the product tested in the cloud computing environment is effective.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1A:
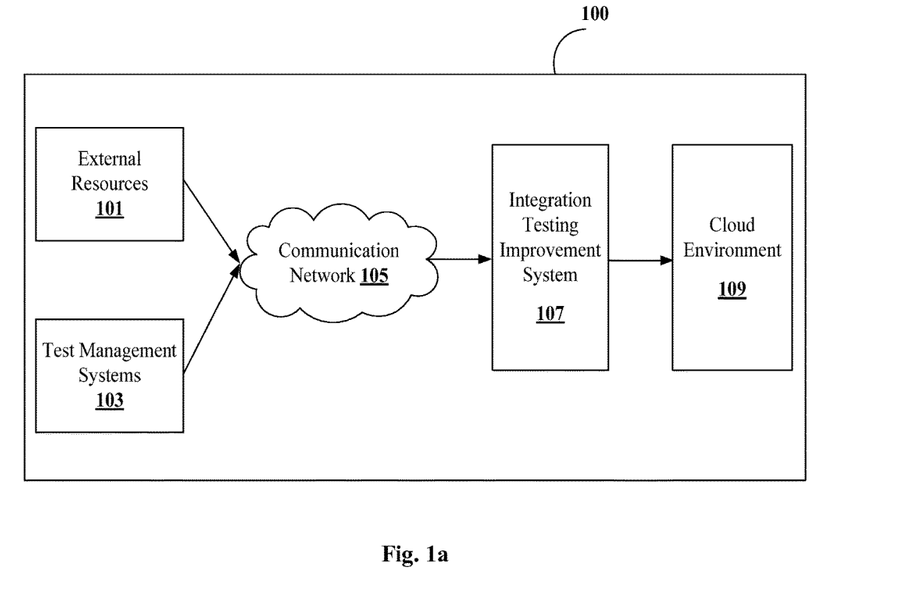
FIG. 1a shows an exemplary environment in accordance with some embodiments of the present disclosure.

FIG. 1a shows an exemplary environment 100 in accordance with some embodiments of the present disclosure.

The environment 100 comprises one or more external resources 101, test management systems 103, a communication network 105, an integration testing improvement system 107 and a cloud environment 109. In an embodiment, the one or more external resources 101 may include, but not limited to, media, social media, internet and any other resource from where the performance reports of any specific product 102 (shown in FIG. 2) deployed in the cloud environment 109 could be collected to track user experience. The test management systems 103 are the locations where the information about the test cases, defects and requirements of the products 102 are stored. In an embodiment, the test management systems 103 may be a Hewlett Packard Application Lifecycle Management (HPALM) system which is a tool for test case repository and execution. The communication network 105 may include but not limited to a wired communication network, a wireless communication network and a combination thereof. The integration testing improvement system 107 configured in the environment 100 receives one or more input parameters from the one or more external resources 101 and the test management systems 103 through the communication network 105. The one or more input parameters may include, but not limited to, defect parameters 117, user requirements 119, test parameters 121 and performance parameters 123. The cloud environment 109 is a model for enabling ubiquitous network access to a shared pool of configurable computing resources. The cloud environment 109 is where the physical devices are virtualized so that it would reduce the overall cost of resource deployment and utilization.

Figure 1B:
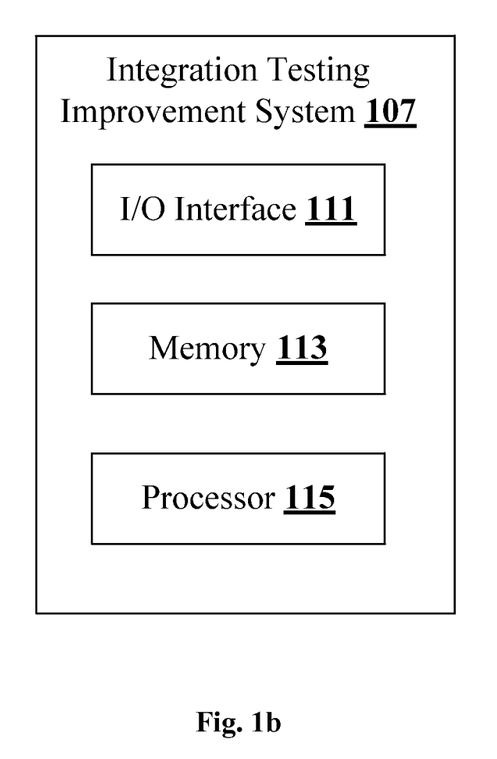
FIG. 1b shows a block diagram illustrating an integration testing improvement system in accordance with some embodiments of the present disclosure.

FIG. 1b shows a block diagram illustrating an integration testing improvement system 107 in accordance with some embodiments of the present disclosure.

The integration testing improvement system 107 comprises an I/O interface 111, a memory 113 and a processor 115. The I/O interface 111 is configured to receive data from the one or more external resources 101 and test management systems 103. The data is associated with one or more input parameters corresponding to one or more products 102 deployed in the cloud environment 109. The received data is stored in the memory 113. The memory 113 is communicatively coupled to the processor 115. The processor 115 receives one or more input parameters, associated with the one or more products 102 from the one or more external resources 101 and test management systems 103. The processor 115 determines one or more failure issues corresponding to each of the one or more products 102 based on the one or more input parameters. Further, the processor 115 analyses behavior of each of the one or more products 102 for a predetermined time period based on the one or more input parameters to identify one or more failure patterns corresponding to each of the one or more products 102. Thereafter, the processor 115 maps the one or more failure issues with the one or more failure patterns to detect one or more critical scenarios in each of the one or more products 102 and proceeds to automate the one or more critical scenarios by executing associated test scripts, in order to improve the integration testing in the cloud environment 109.

Figure 1C:
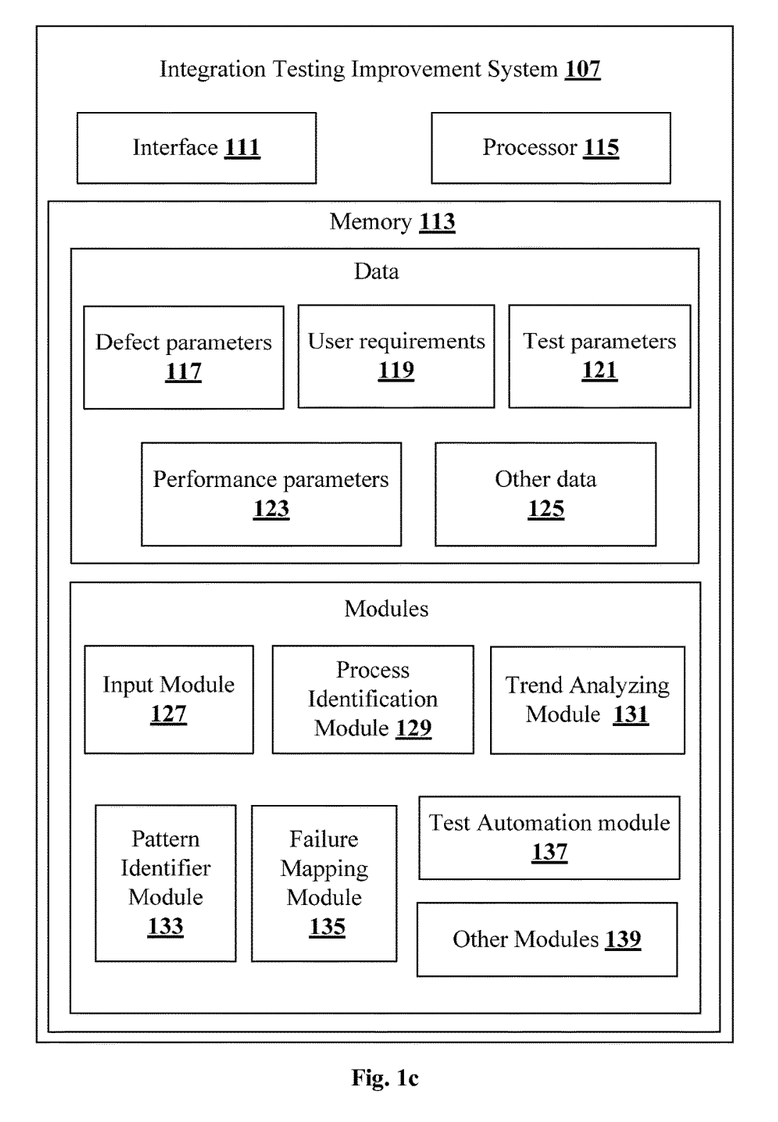
FIG. 1c shows a detailed block diagram illustrating an integration testing improvement system in accordance with some embodiments of the present disclosure.

FIG. 1c shows a detailed block diagram illustrating an integration testing improvement system 107 in accordance with some embodiments of the present disclosure.

In one implementation, the integration testing improvement system 107 receives data associated with one or more input parameters from the one or more external resources 101 and test management systems 103. As an example, the one or more input parameters are stored within the memory 113. In an embodiment, the one or more input parameters include defect parameters 117, user requirements 119, test parameters 121, performance parameters 123 and other data 125. In the illustrated FIG. 1c, one or more modules stored in the memory 113 are described herein in detail.

In one embodiment, the data may be stored in the memory 113 in the form of various data structures. Additionally, the aforementioned data can be organized using data models, such as relational or hierarchical data models. The other data 125 may store data, including temporary data and temporary files, generated by modules for performing the various functions of the integration testing improvement system 107.

In an embodiment, the defect parameters 117 are received from the one or more external resources 101 and test management systems 103. The defect parameters 117 correspond to one or more defects of one or more products 102 deployed in the cloud environment 109. As an example, the defect parameters 117 may include, but not limited to, total number of specific defects that have been encountered at the user end or specific issues that were reported during deployment of a specific product in the cloud environment 109.

In an embodiment, the user requirements 119 include information related to one or more requirements of the user for a specific product in the cloud. As an example, a specific requirement of a user, using a web application, may be that the "login" form displayed on a webpage should be positioned in the "left bottom corner" of the webpage.

In an embodiment, the test parameters 121 include information related to the previous history of testing the product with one or more other test parameters 121. As an example, the one or more test parameters 121 may include, but not limited to, failure issues associated with the product on performing specific transactions by the user and overall stability of the product.

In an embodiment, the performance parameters 123 associated with the product are the parameters that determine one or more performance issues related to the product when used by one or more users. The performance parameters 123 may include, but not limited to, usage trend of the product over a determined time period and one or more specific customer issues reported because of which the performance was affected.

In an embodiment, the data stored in the memory 113 are processed by the modules of the integration testing improvement system 107. The modules may be stored within the memory 113 as shown in FIG. 1c. In an example, the modules, communicatively coupled to the processor 115, may also be present outside the memory 113.

In one implementation, the modules may include, for example, an input module 127, a process identification module 129, a trend analyzing module 131, a pattern identifier module 133, a failure mapping module 135, a test automation module 137 and other modules 139. The other modules 139 may be used to perform various miscellaneous functionalities of the integration testing improvement system 107. It will be appreciated that such aforementioned modules may be represented as a single module or a combination of different modules.

In an embodiment, the input module 127 is configured to receive one or more input parameters, associated with one or more products 102 in the cloud computing environment 109. The one or more input parameters are received from the one or more external resources 101 and test management systems 103. The one or more input parameters may include, but not limited to, defect parameters 117, user requirements 119, test parameters 121 and performance parameters 123 associated with the product in the cloud computing environment 109.

In an embodiment, the process identification module 129 is configured to identify a specific business process flow that causes the most distress or problem to the users of one or more products 102. In the cloud environment 109 it is very difficult to automate everything that is available. So, to narrow down to a specific issue the first step is to split the one or more failure issues based on specific products 102. For a specific product, the process identification module 129 identifies a specific process, associated with a product, that requires the most attention. Based on the one or more input parameters received from the input module 127, the process identification module 129 provides a rating for each of the one or more failure issues.

In an embodiment, the trend analyzing module 131 is configured to analyze the overall trend of a product 102. The trend analyzing module 131 analyzes behavior of each of the one or more products 102 for a predetermined time period based on one or more input parameters to identify one or more failure trend corresponding to each of the one or more products 102. As an example, the trend analyzing module 131 analyzes behavior of each of the one or more products 102 over a period of past 3 releases and analyzes all the input parameters.

In an embodiment, the pattern identifier module 133 analyzes the specific pattern in which the one or more failures occur. In an embodiment, the failure mapping module 135 maps the one or more failure issues with the one or more failure patterns to detect the one or more critical scenarios in each of the one or more products 102.

In an embodiment, the test automation module 137 is configured to automate the one or more critical scenarios, by executing associated test scripts. The Test Automation module 137 requests for cloud environments 109 and automates the scenarios in the cloud environment 109. The Test Automation module 137 upon receiving the critical scenarios, reviews the need for test environment. As an example, the test environment could be a data base access, a Graphical User Interface (GUI) or any other application. After determining the list of environments for automating a specific critical scenario, the Test Automation module 137 triggers the cloud environment 109 for creating or simulating these test environments in the cloud environment 109. The cloud environment 109 either virtualizes or creates these test environments to carry out testing. After the scripts are automated they are deployed in a production environment and testing is carried out directly from the cloud environment 109.

Figure 2:
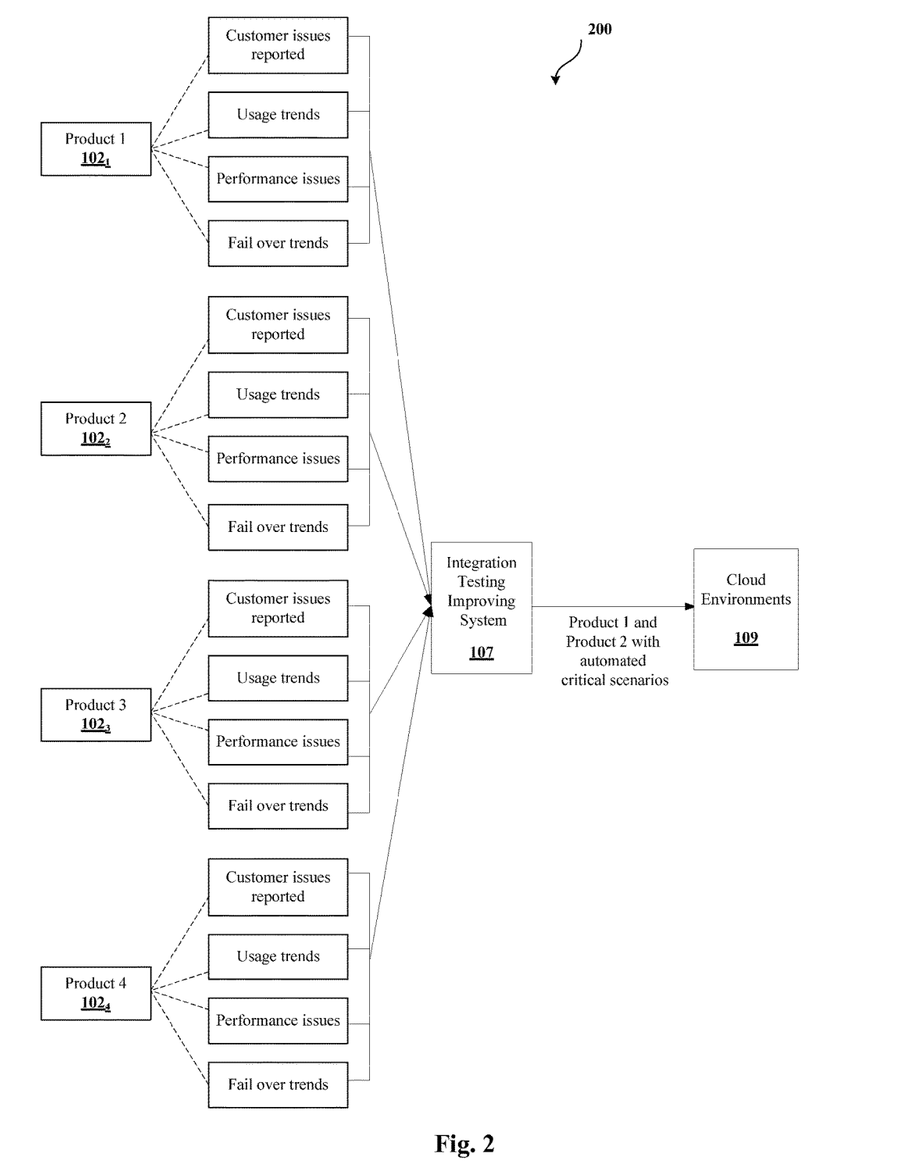
FIG. 2 illustrates a method for improving integration testing in a cloud computing environment in accordance with some exemplary embodiments of the present disclosure.

FIG. 2 shows a block diagram 200 illustrating a method for improving integration testing in a cloud computing environment 109 in accordance with some exemplary embodiments of the present disclosure.

As shown in FIG. 2, four products, product 1 1021, product 2 1022, product 3 1023 and product 4 1024, collectively referred to as products 102, are deployed in the cloud environment 109. The one or more input parameters associated with each of the products 102 are received by the integration testing improvement system 107 through the communication network 105. Further, the integration testing improvement system 107 performs one or more actions on the one or more input parameters using the one or more modules configured in the integration testing improvement system 107.

In an embodiment, the input module 127 configured in the integration testing improvement system 107 receives the one or more input parameters from the one or more external resources 101 and test management systems 103. The received input parameters are provided to the process identification module 129 for further analysis. In the process identification module 129, the one or more input parameters are analyzed to identify the processes which require utmost attention. Based on the analysis a rating is provided to each of the one or more input parameters as provided in Table A.

TABLE A

| Rating | Value |
|---|---|
| High | 3 |
| Medium | 2 |
| Low | 1 |

Further, the process identification module 129 performs analysis of the one or more input parameters and based on the analysis, classifies the one or more input parameters as critical, major and minor. Each of the classified input parameters are provided with a value. In an exemplary embodiment, if Critical and Major issues are more than 50% of the total number of issues reported, then for the corresponding input parameter, a rating is provided as High as shown in Table B. If Critical and Major issues are less than 40% of the total number of issues reported, then for the corresponding input parameter a rating is provided as Low as indicated in Table B. Similarly, if Critical and Major issues are between 40% and 50% of the total number of issues reported, then the corresponding input parameter is classified as Medium as indicated in Table B.

Therefore, the product 1 1021 is rated Medium since the total number of critical issues and major issues reported is between 40% and 50%, the product 2 1022 is rated High since the total number of critical issues and major issues reported is more than 50%, the product 3 1023 is rated Low since the total number of critical issues and major issues reported is less than 50%, the product 4 1024 is rated Medium since the total number critical issues and major issues reported is between 40% and 50% as shown in the below Table C.

TABLE B

| | | Critical issues | Major issues | Minor issues | Value |
|---|---|---|---|---|---|
| Customer issues over previous releases | Product 1 | 30% | 10% | 60% | Medium |
| | Product 2 | 70% | 20% | 10% | High |
| | Product 3 | 20% | 10% | 70% | Low |
| | Product 4 | 20% | 25% | 65% | Medium |

Further, a specific product 102 deployed in the cloud environment 109 can be accessed from different locations from different users. In such a case, the severity of High, Medium and Low ratings are assigned based on the total number of modules accessing the product 102. The one or more modules associated with a product 102 may include, but not limited to, the display interface of the product 102, processing unit associated with the product 102 and other modules configured in the product 102. As an example, if the total number of modules accessing the product 102 is greater than 7, then the product 102 is rated as High. If the total number of modules accessing the product 102 is less than 5, then the product 102 is rated as Low. And if the total number of modules accessing the product 102 is between 5 and 7, then the product 102 is rated as Medium.

Therefore, the product 1 1021 is rated Medium since the total number of modules accessing product 1 1021 is 5, the product 2 1022 is rated High since the total number of modules accessing the product 2 1022 is 10, the product 3 1023 is rated Medium since the total number of modules accessing the product 3 1023 is 3 and the product 4 1024 is rated Low since there are no modules accessing the product 4 1024 as shown in the below Table C.

TABLE C

| | | No of modules | Value |
|---|---|---|---|
| User Access | Product 1 | 5 | Medium |
| | Product 2 | 10 | High |
| | Product 3 | 3 | Low |
| | Product 4 | 0 | Low |

Furthermore, the specific transaction failures are calculated based on the total number of failures which occurs over a predetermined time period. The values are assigned to each of the products 102 based on the total number of failure issues occurred in the previous history of using the product 102. As an example, if the total number of failure issues is greater than 7, then the product 102 is rated as High. If the total number of failure issues is less than 5, then the product 102 is rated as Low. And if the total number of failure issues is between 5 and 7, then the product 102 is rated as Medium.

Therefore, the product 1 1021 is rated High since the total number of failure issues associated with the product 1 1021 is 8, the product 2 1022 is rated Medium since the total number of failure issues associated with the product 2 1022 is 5, the product 3 1023 is rated Medium since the total number of failure issues associated with the product 3 1023 is 4 and the product 4 1024 is rated Low since no failure issues were reported for the product 4 1024 as shown in the below Table D.

TABLE D

|  | | No of failures | Value |
|---|---|---|---|
| Specific | Product 1 | 8 | High |
| Transaction | Product 2 | 5 | Medium |
| Failure | Product 3 | 4 | Medium |
| issues | Product 4 | 0 | Low |

In an embodiment, the total number of issues reported during the deployment of a specific product 102 in the cloud environment 109 is taken as input from the Input module 127 and the all the deployment issues are mapped to high, medium and low based on the overall deployment issues reported over a predetermined time period. As an example, if the total number of deployment issues reported is greater than 7, then the product 102 is rated as High. If the total number of deployment issues reported is less than 5, then the product 102 is rated as low. And, if the total number of deployment issues reported is between 5 and 7, then the product 102 is rated as Medium.

Therefore, the product 1 1021 is rated Low since the total number of deployment issues associated with the product 1 1021 is 3, the product 2 1022 is rated Medium since the total number of deployment issues associated with the product 2 1022 is 5, the product 3 1023 is rated Medium since the total number of deployment issues associated with the product 3 1023 is 6 and the product 4 1024 is rated Low since the total number of deployment issues associated with the product 4 1024 is 2. This data is determined by the process identification module 129 as shown in the below Table E.

TABLE E

|  | | Total Issues | Value |
|---|---|---|---|
| Issues in | Product 1 | 3 | Low |
| Deployment | Product 2 | 5 | Medium |
|  | Product 3 | 6 | Medium |
|  | Product 4 | 2 | Low |

Additionally, the process identification module 129 also determines the stability of the one or more products 102 based on the one or more input parameters i.e. customer issues reported, user trends, performance issues and failover trends. The total number of High, Medium and Low ratings assigned to each of the one or more products 102 determine the overall stability of the product 102. If the total values corresponding to each of the one or more input parameters associated with a product 102 are High, then the overall stability of the product 102 will be Low.

As shown in the below Table F, the product 1 1021 and the product 2 1022 are considered to be least stable since the values corresponding to the one or more input parameters associated with product 1 1021 and product 2 1022 are High. Similarly, the product 3 1023 and the product 4 1024 are considered to be comparatively more stable since the values corresponding to the one or more input parameters associated with product 3 1023 and product 4 1024 are Medium and Low respectively.

TABLE F

|  | Customer issues reported | User Access | Specific Transaction Failures issues | Deployment issues | Overall Stability |
|---|---|---|---|---|---|
| Product 1 | 2 | 2 | 3 | 1 | 1 |
| Product 2 | 3 | 3 | 2 | 2 | 1 |

TABLE F-continued

|  | Customer issues reported | User Access | Specific Transaction Failures issues | Deployment issues | Overall Stability |
|---|---|---|---|---|---|
| Product 3 | 1 | 1 | 2 | 2 | 2 |
| Product 4 | 2 | 1 | 1 | 1 | 3 |

The product that is most unstable is taken for analysis first as the most unstable product 102 causes most disturbances. So, the most unstable product 102 needs to be automated at highest priority. So, as indicate in the Table F, Product 1 1021 and Product 2 1022 are taken with highest priority for automation.

The results obtained by the Process Identification module 129 are provided to the trend analyzing module 131. The trend analyzing module 131 then analyzes the behavior of a particular product 102 over a predetermined time period and determines the trend result associated with the product 102. The Table G shown below illustrates the overall trend results associated with the one or more products 102. (The fields marked as NA represent that the corresponding values are Not Applicable for a particular product 102). The trend result for the product 2 1022 and the product 3 1023 is the multiplication product of the specific values assigned to each of the input parameters associated with the product 102. The product 1 1021 and product 4 1024 are not assigned a trend value since the trend data associated with the product 1 1021 and product 2 1022 for the predetermined time period is not available.

TABLE G

|  | Customer issues reported | Usage Trend | Performance Issues | Fail over trends | Result |
|---|---|---|---|---|---|
| Product 1 | NA | 2 | 2 | 1 | 0 |
| Product 2 | 3 | 3 | 2 | 2 | 24 |
| Product 3 | 2 | 2 | 2 | 2 | 16 |
| Product 4 | 1 | NA | NA | 1 | 0 |

The different input parameters considered for the trend analysis of the products 102 are customer issues reported, usage trend, and performance issues and fail over trends associated with the product 102. These input parameters are same as the one or more input parameters used for determining the stability associated with a product 102, namely, total number of customer issues reported over previous releases of the product 102, total number of modules accessing the product 102, total number of specific transaction issues and total number of issues in reported during deployment of the product 102.

In an embodiment, the Customer issues Reported are the total number of issues reported by the customer over the predetermined time period based on which a specific value is assigned to each of the one or more products 102. As an example, if the total number of issues reported by customer is higher than X1, then the assigned value is high. If the total number of issues reported by the customer is less than Y1, then the assigned value is low. And if the total number of issues reported by customer is between X1 and Y1, then the assigned value is medium. Wherein, the variable X1 is a first minimum threshold value and variable Y1 is a first maximum threshold value used to classify the one or more products 102 based on the number of customer issues reported.

In an embodiment, the Usage Trend is based on the usage history data of the one or more products 102 for a predetermined time period, i.e. the total number people who access the system based on which a specific value is assigned to each of the products 102. As an example, if the total number of users using the product 102 is higher than X2, then the assigned value is high. If the total number of users using the product 102 is less than Y2, then the assigned value is low. And if the total number of users using the product 102 is between X2 and Y2, then the assigned value is medium. Wherein, the variables X2 and Y2 are the configurable values to classify number of users using the product 102. Wherein, the variable X2 is a second minimum threshold value and variable Y2 is a second maximum threshold value used to classify the one or more products 102 based on the number of users using the product 102.

In an embodiment the Performance issues includes information about the one or more failure issues related to the performance of the one or more products 102 in the cloud environment 109. Based on the total number of performance issues reported, a specific value is assigned to each of the one or more products 102. As an example, if the total number of performance issues reported is higher than X3 then the assigned value is high. If the total number of performance issues reported is less than Y3, then the assigned value is low. And if the total number of performance issues reported is between X3 and Y3, then the assigned value is medium. Wherein, the variable X3 is a third minimum threshold value and variable Y3 is a third maximum threshold value used to classify the one or more products 102 based on the number of performance issues reported.

In an embodiment, the Fail over Trends is the issue expected to happen because of deployment issues and specific transaction failure. A specific value is assigned to the each of the fail over trends based on the total number of fail over trends reported during a predetermined time period. As an example, if the total number of fail overs is higher than X4, then the assigned value is high. If the total number of fail overs is less than Y4, then the assigned value is low. And if the total number of fail overs is between X4 and Y4, then the assigned value is medium. Wherein, the variable X4 is a fourth minimum threshold value and variable Y4 is a fourth maximum threshold value used to classify the number of fail overs reported in the predetermined time period.

In an embodiment, the result of overall trend analysis is determined as a product 102 of each of the values assigned to the each of the input parameters, namely, customer issues reported, usage trend, performance issues and fail over trends. i.e. Result of trend analysis=customer issues reported*usage trend*performance issues*fail over trends.

In an embodiment, after determining the result of trend using the trend analyzing module 131, the result of trend is provided to the pattern identifier module 133 to identify a pattern in which the failures are happening. Further, the Failure Mapping module 135 is used to map the one or more failure issues with the one or more failure patterns to identify the one or more critical scenarios for automation. The result of trend data from Trend Analyzing 131 provided to the Pattern Identifier 133 is a critical input which helps in identifying the pattern. If the pattern of failure is always consistent and similar kind of failures repeatedly happen, then that particular failure issue is identified and the details are provided to the Failure Mapping. The Table H provided below illustrates an exemplary method of pattern identification.

TABLE H

| | Pattern Identification | |
|---|---|---|
| | Result of Trend Analysis | Critical Point |
| Product 1 | 0 | NA |
| Product 2 | 24 | 1 |
| Product 3 | 16 | 2 |
| Product 4 | 0 | NA |

The Critical point, as shown in the Table H, is analyzed based on the result of trend analysis. The product 102 having highest trend analysis result is the product 102 with most critical issue i.e. the product 102 with a highest trend analysis result is most vulnerable over a predetermined time period and needs immediate attention. Hence the product 102 with a highest trend analysis result should be considered as input for automation. For example the trend analysis point given in Table H shows product 2 1022 as the highest trend result. Pattern identifier module 133 takes those input values and starts looking at critical failure issues.

TABLE I

| | | Critical failure issues | Major failure issues | Minor failure issues | Value |
|---|---|---|---|---|---|
| Customer issues in a predetermined time period | Product 1 | 30% | 10% | 60% | Medium |
| | Product 2 | 70% | 20% | 10% | High |
| | Product 3 | 20% | 10% | 70% | Low |
| | Product 4 | 20% | 25% | 65% | Medium |

As shown in Table I, the product 2 1022 has about 70% of critical issues in the predetermined time period. The one or more issues in the product 2 1022 are considered by the pattern identifier module 133 to identify a specific failure pattern associated with the product 2 1022. The identified pattern is mapped to the modules present in the product 2 1022 as shown below in the Table J.

TABLE J

| Product 2 | Module 1 | Module 2 | Module 3 | Module 4 | Module 5 |
|---|---|---|---|---|---|
| Scenario 1 | X | | X | | X |
| Scenario 2 | X | X | | X | |
| Scenario 3 | X | X | X | X | X |
| Scenario 4 | | X | | | |
| Scenario 5 | | | X | | |

Based on the above Table J, scenario 3 is considered the most critical scenario followed by scenario 2 since all five modules of the product 2 1022 are being affected by the scenario 3. Now the inputs of this scenario are provided to the Failure Mapping module 135. The Failure Mapping module 135 maps the critical scenario with the total number of occurrences based on the one or more input parameters obtained from the one or more external resources 101 and test management systems 103. The Test management systems 103 contain the total number of issues that have been raised for the product 102 over a predetermined time period. The issues are mapped to each of the scenarios using the failure pattern identified in the test management systems 103. The occurrence of the same scenario or a similar scenario is used to determine the total number of occurrences. Therefore, for the product 2 1022, the total number occurrences of scenario 1 is 20, scenario 2 is 50, scenario 3 is 30, scenario 4 is 10 and scenario 5 is 10 as shown in the Table K below.

TABLE K

| Product 2 | Occurrence |
| --- | --- |
| Scenario 1 | 20 |
| Scenario 2 | 50 |
| Scenario 3 | 30 |
| Scenario 4 | 10 |
| Scenario 5 | 10 |

Now, based on the total number of occurrences, the scenario with the most number of occurrences is fed to the automation system for automating.

The critical scenarios that have been identified by the pattern identifier module 133 and the Failure Mapping module 135 are the provided to the Test Automation module 137 for automation. The Test Automation module 137 after receiving the one or more critical scenarios reviews the need for test environment. Now when the list of environment for specific scenarios is determined, the Test Automation module 137 triggers the cloud environment 109 for creating these environments in the cloud. The cloud environment 109 either virtualizes or creates these requested test environments to carry out testing. After the scripts are automated the same are deployed in a production environment and testing is carried out directly from the cloud.

Figure 3:
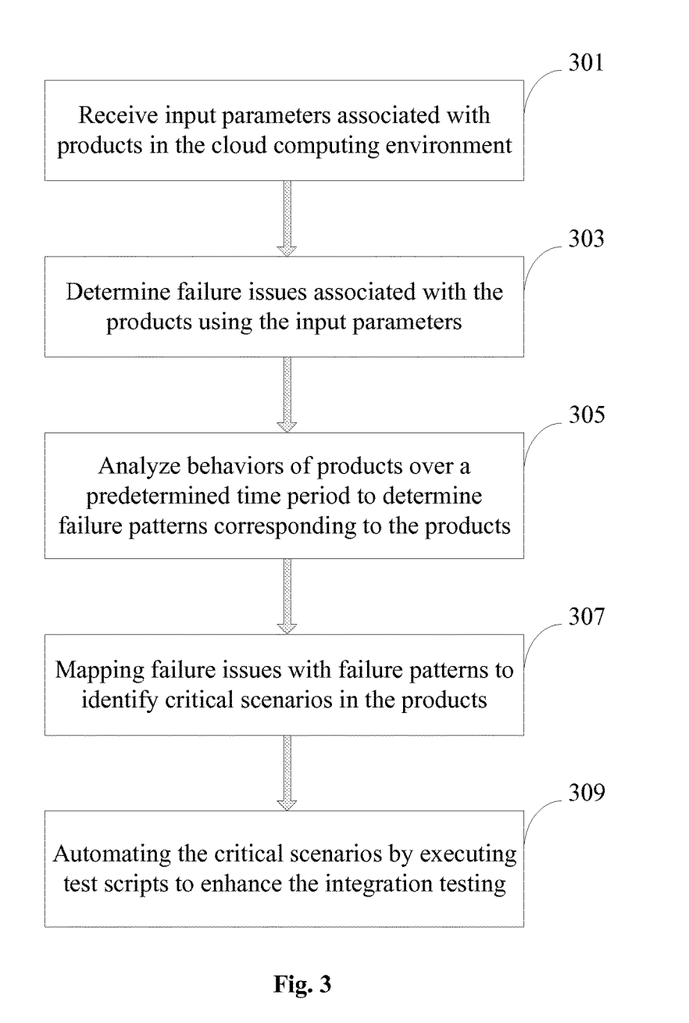
FIG. 3 illustrates a flowchart showing method for improving integration testing in a cloud computing environment in accordance with some embodiments of the present disclosure.

FIG. 3 illustrates a flowchart showing method for improving integration testing in a cloud computing environment 109 in accordance with some embodiments of the present disclosure.

As illustrated in FIG. 3, the method 300 comprises one or more blocks for improving integration testing of one or more products 102 using an integration testing improvement system 107. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, one or more input parameters, associated with one or more products 102 in the cloud computing environment 109 are received by the integration testing and improvement system. The one or more input parameters comprises at least one of defect parameters 117, user requirements 119, test parameters 121 and performance parameters 123 associated with the product 102 in the cloud computing environment 109.

At block 303, one or more failure issues corresponding to each of the one or more products 102 based on the one or more input parameters are determined by the integration testing improvement system 107. Determining the one or more failure issues comprises identifying failure occurrence count corresponding to each of the one or more products 102. Further, the failure occurrence count is compared with a predefined minimum threshold value and a predefined maximum threshold value. A rating is provided to each of the one or more input parameters corresponding to each of the one or more products 102 based on the comparison. Finally, the integration testing improvement system 107 detects overall stability of each of the one or more products 102 based on the provided rating.

At block 305, behavior of each of the one or more products 102 are analyzed by the integration testing improvement system 107. The analysis is carried out for a predetermined time period to identify one or more failure patterns corresponding to each of the one or more products 102.

At block 307, the one or more failure issues are mapped with the one or more failure patterns to detect one or more critical scenarios in each of the one or more products 102. The one or more failure patterns are analyzed by the Pattern Identifier module 133. The mapping of one or more failure issues with the one or more failure pattern is performed by the Failure Mapping module 135.

At block 309, the one or more critical scenarios are automated by executing associated test scripts using a Test Automation module 137. The Test Automation module 137 requests for cloud environment 109 and starts automating the scenarios correspondingly.

Computer System

Figure 4:
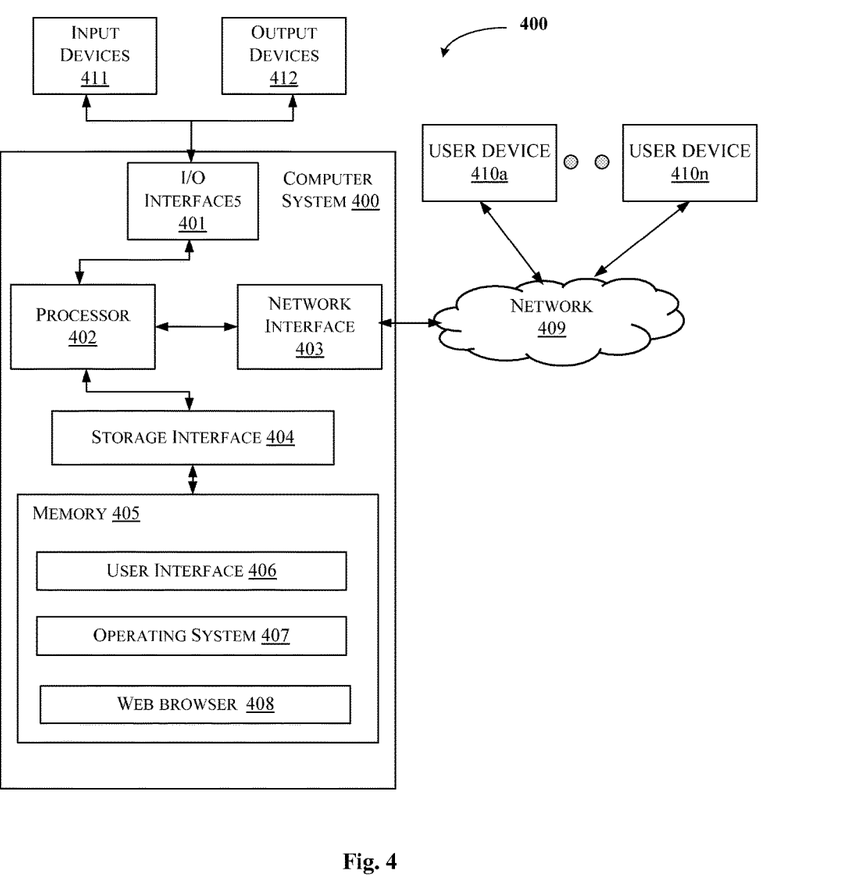
FIG. 4 illustrates a block diagram of an exemplary computer system for implementing embodiments consistent with the present disclosure.

FIG. 4 illustrates a block diagram of an exemplary computer system 400, such as an integration testing improvement computing device 400 by way of example only, for implementing embodiments consistent with the present invention. In an embodiment, the computer system 400 is used to improve integration testing in a cloud computing environment 109 based on the one or more input parameters associated with the one or more products 102, deployed in the cloud computing environment 109, using an integration testing improvement system 107. The computer system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more user devices 410 (a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more user devices 410 (a, . . . , n) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides a method to improve integration testing of one or more products deployed in a cloud environment.

In an embodiment, the present disclosure provides a method to completely automate the one or more critical failure scenarios associated with the one or more products.

In an embodiment, the present disclosure provides a method to determine an environment suitable for automating the one or more scenarios of the products in the cloud environment.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for improving integration testing in a cloud computing environment, the method comprising:
   receiving, by an integration testing improvement computing device, one or more input parameters, associated with one or more products in the cloud computing environment;
   determining, by the integration testing improvement computing device, one or more failure issues corresponding to each of the one or more products based on the one or more input parameters;
   analyzing, by the integration testing improvement computing device, behavior of each of the one or more products for a predetermined time period based on the one or more input parameters to identify one or more failure patterns corresponding to each of the one or more products;
   mapping, by the integration testing improvement computing device, the one or more failure issues with one or more scenarios using the one or more failure patterns mapped respectively to modules present in each of the one or more products to detect one or more critical scenarios in each of the one or more products, wherein a critical scenario from the one or more critical scenarios for a product from the one or more products is a scenario which adversely affects the product in comparison to other scenarios from the one or more scenarios;
   determining, by the integration testing improvement computing device, the critical scenario, from the one or more critical scenarios, with most number of occurrences for the product from the one or more products; and
   automating, by the integration testing improvement computing device, initially the critical scenario with most number of occurrences for the product followed by the one or more critical scenarios by executing associated test scripts, thereby improving the integration testing in the cloud computing environment.

2. The method as claimed in claim 1, wherein the one or more input parameters comprises at least one of defect parameters, user requirements, test parameters or performance parameters associated with the product in the cloud computing environment.

3. The method as claimed in claim 2, wherein the one or more input parameters are received from one or more external resources and test management systems.

4. The method as claimed in claim 1 further comprises identifying one or more processes, associated with each of the one or more products, causing the one or more failure issues.

5. The method as claimed in claim 1, wherein determining the one or more failure issues comprises:
   identifying failure occurrence count, associated with each of the one or more input parameters, corresponding to each of the one or more products;
   comparing the failure occurrence count with a predefined minimum threshold value and a predefined maximum threshold value;
   providing a rating for each of the one or more input parameters corresponding to each of the one or more products based on the comparison; and
   detecting overall stability of each of the one or more products based on the rating.

6. The method as claimed in claim 1 further comprises identifying one or more test environments for each of the one or more critical scenarios.

7. The method as claimed in claim 6, wherein the identified one or more test environments are deployed in the cloud computing environment for testing each of the one or more critical scenarios.

8. An integration testing computing device comprises:
   a processor; and
   a memory communicatively coupled to the processor, wherein the memory stores processor-executable instructions, which, on execution, causes the processor to:
   receive one or more input parameters associated with one or more products in the cloud computing environment;
   determine one or more failure issues corresponding to each of the one or more products based on the one or more input parameters;
   analyze behavior of each of the one or more products for a predetermined time period based on one or more input parameters to identify one or more failure patterns corresponding to each of the one or more products;
   map the one or more failure issues with one or more scenarios using the one or more failure patterns mapped respectively to modules present in each of the one or more products to detect one or more critical scenarios in each of the one or more products, wherein a critical scenario from the one or more critical scenarios for a product from the one or more products is a scenario which adversely affects the product in comparison to other scenarios from the one or more scenarios;
   determine the critical scenario, from the one or more critical scenarios, with most number of occurrences for the product from the one or more products; and
   automate, initially the critical scenario with most number of occurrences for the product followed by the one or more critical scenarios by executing associated test scripts, thereby improving the integration testing in the cloud computing environment.

9. The integration testing improvement system as claimed in claim 8, wherein the one or more input parameters comprises at least one of defect parameters, user requirements, test parameters or performance parameters associated with the one or more products in the cloud computing environment.

10. The integration testing improvement system as claimed in claim 9, wherein the processor receives the one or more input parameters from one or more external resources and a test management system.

11. The integration testing improvement system as claimed in claim 8, wherein the processor is further configured to identify one or more processes, associated with each of the one or more products, causing the one or more failure issues.

12. The integration testing improvement system as claimed in claim 8, wherein the processor determines the one or more failure issues by:
    identifying failure occurrence count, associated with each of the one or more input parameters, corresponding to each of the one or more products;
    comparing the failure occurrence count with a predefined minimum threshold value and a predefined maximum threshold value;
    providing a rating for each of the one or more input parameters corresponding to each of the one or more products based on comparison; and
    detecting overall stability of each of the one or more products based on the rating.

13. The integration testing improvement system as claimed in claim 8, wherein the processor is further configured to identify one or more test environments for each of the one or more critical scenarios.

14. The integration testing improvement system as claimed in claim 13, wherein the processor deploys the one or more test environments in the cloud computing environment for testing each of the one or more critical scenarios.

15. A non-transitory computer readable medium having stored thereon instructions for improving integration testing in a cloud computing environment comprising machine executable code which when executed by a processor, causes the processor to perform steps to:
    receive one or more input parameters associated with one or more products in the cloud computing environment;
    determine one or more failure issues corresponding to each of the one or more products based on the one or more input parameters;
    analyze behavior of each of the one or more products for a predetermined time period based on one or more input parameters to identify one or more failure patterns corresponding to each of the one or more products;
    map the one or more failure issues with one or more scenarios using the one or more failure patterns mapped respectively to modules present in each of the one or more products to detect one or more critical scenarios in each of the one or more products, wherein a critical scenario from the one or more critical scenarios for a product from the one or more products is a scenario which adversely affects the product in comparison to other scenarios from the one or more scenarios;
    determine the critical scenario, from the one or more critical scenarios, with most number of occurrences for the product from the one or more products; and
    automate initially the critical scenario with most number of occurrences for the product followed by the one or more critical scenarios by executing associated test scripts, thereby improving the integration testing in the cloud computing environment.

16. The medium as claimed in claim 15, wherein the one or more input parameters comprises at least one of defect parameters, user requirements, test parameters or performance parameters associated with the product in the cloud computing environment.

17. The medium as claimed in claim 16, wherein the one or more input parameters are received from one or more external resources and a test management system.

18. The medium as claimed in claim 15, further comprising machine executable code which when executed by the processor, causes the processor to perform steps to identify one or more processes, associated with each of the one or more products, causing the one or more failure issues.

19. The medium as claimed in claim 15, wherein the step to determine the one or more failure issues further comprises machine executable code which when executed by the processor, causes the processor to perform steps to and that comprise:
    identify failure occurrence count, associated with each of the one or more input parameters, corresponding to each of the one or more products;
    compare the failure occurrence count with a predefined minimum threshold value and a predefined maximum threshold value;
    provide a rating for each of the one or more input parameters corresponding to each of the one or more products based on comparison; and
    detect overall stability of each of the one or more products based on the rating.

20. The medium as claimed in claim 15, further comprising machine executable code which when executed by the processor, causes the processor to perform steps to identify one or more test environments for each of the one or more critical scenarios.

21. The medium as claimed in claim 20, further comprising machine executable code which when executed by the processor, causes the processor to perform steps to deploy the one or more test environments in the cloud computing environment for testing each of the one or more critical scenarios.

* * * * *